United States Patent Office 3,493,580
Patented Feb. 3, 1970

3,493,580
1,4- AND 1,3-BIS(3'-Δ²' ISOXAZOLINYL) BENZENE DERIVATIVES AND PROCESS FOR THE MANUFACTURE OF THE SAME
Yoshio Iwakura and Masayasu Akiyama, Tokyo, Japan, assignors to Mitsubishi Petrochemical Company, Limited
No Drawing. Continuation-in-part of application Ser. No. 443,167, Mar. 21, 1965. This application Nov. 28, 1966, Ser. No. 597,241
Claims priority, application Japan, Mar. 30, 1964, 39/17,282
Int. Cl. C07d *85/08*
U.S. Cl. 260—307   4 Claims

---

ABSTRACT OF THE DISCLOSURE

The bis(3'Δ²'-isoxazolinyl) benzene adduct formed by the reaction of tere- or isophthalonitrile oxide and a compound selected from the group consisting of (a) the monofunctional unsaturated compounds having the structural formula,

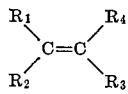

wherein $R_1$, $R_2$, $R_3$ and $R_4$ are selected from the group consisting of -alkyl, -aryl, -cyano, -alkyl halide, -hydrogen, -alkoxy, -hydroxy alkyl, -halide, -carboalkoxy, -acyloxy, and -amide, (b) indene, dicyclopentadiene, cyclopentadiene, N-phenylmaleimide, maleic anhydride, cyclohexene, and allyl glycidyl ether. A polymer having bis(3'-Δ²'-isoxazolinyl) benzene as a repeating unit.

---

This is a continuation-in-part of application Ser. No. 443,167, filed Mar. 26, 1965 (now abandoned).

The present invention relates to 1,4- or 1,3-bis(3'-Δ²'-isoxazolinyl) benzene derivatives including novel polymeric products and compounds and processes for the manufacture of the same from tere- or isophthaldinitrile N-oxide and an unsaturated compound.

We inventors have succeeded in purely producing at a high rate of yield a new compound tere-phthaldinitrile N-oxide represented by the formula:

of isophthaldinitrile N-oxide represented by the formula:

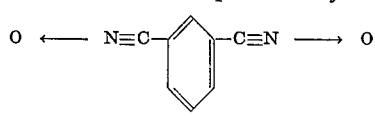

(which shall be abbreviated as TNO or INO, respectively, hereinafter) from a tere- or isophthalhydroxamic halide.

The tere- or isophthaldinitrile N-oxide can be obtained by a process wherein tere- or isophthaldihydroxamic halide is dehydrohalogenated with such tertiary amine as triethyl amine or triethanol amine in the presence of such lower alcohol as methanol or ethanol.

According to one object of the present invention, we provide new compounds 1,4- or 1,3-bis(3'-Δ²'-isoxazolinyl) benzene derivatives.

According to another object of this invention, we provide new polymers having a 1,4- or 1,3-bis(3'-Δ²'-isoxazolinyl) benzene unit, of the formula:

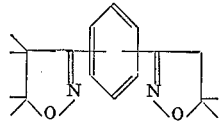

A further object of the present invention is the provision of new 1,3-dipolar cycloaddition polymers having a 1,3- or 1,4-bis-(3'-Δ²'-isoxazolinyl)-benzene unit.

The new compounds 1,4- or 1,3-bis(3'-Δ²'-isoxazolinyl) benzene derivatives are bis adducts of the above-mentioned TNO or INO with various unsaturated compounds.

Typical new compounds 1,4- or 1,3-bis(3'-Δ²'-isoxazolinyl) benzene derivatives are as follows:

(1) 1,4 - bis(5' - methyl - 5' methoxycarbonyl - 3' - Δ²-isoxazolinyl) benzene represented by the following formula:

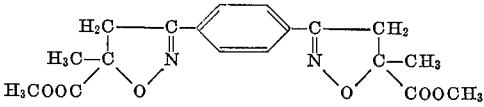

(2) 1,4-bis(5'-hydroxymethyl - 3' - Δ²' -isoxazolinyl) benzene represented by the following formula:

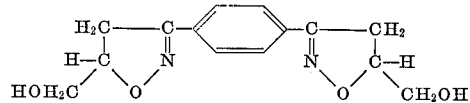

(3) 1,4-bis(5'-butoxy - 3' - Δ²' - isoxazolinyl) benzene represented by the following formula:

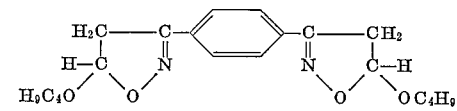

(4) 1,4-bis(4',5'(2'',3''-dihydrodicyclopentadieno - 2''', 3''')Δ²'-isoxazolinyl-3') benzene represented by the following formula:

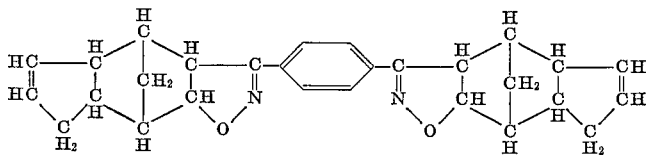

These bis adducts are used as intermediates for the preparation of useful organic compounds. For example, those bis adducts formed in accordance with the present invention and having functional radicals on both sides of the molecule, when made to react with other bi-functional components, will produce various highly polymerized compounds which will be raw materials for new resins and fibers. Bis adducts having ester radicals will cause ester exchanging reactions with glycol to give polyesters. Further, those having hydroxyl radicals will be able to be utilized as raw material compositions for polyesters and polyurethanes.

According to another feature of the present invention, we provide a process for producing 1,4- or 1,3-bis(3'-Δ²'-isoxazolinyl) benzene derivatives comprising making tere- or isophthaldinitrile N-oxide react with an unsaturated compound.

Namely, the above process is a process for producing new compounds 1,4- or 1,3-bis(3'-Δ²'-isoxazolinyl) benzene derivatives which are bis adducts of the above-mentioned TNO or INO with various unsaturated compounds.

Such compound is obtained by making TNO (or INO) react with an unsaturated compound in an amount larger than the equivalent in the presence or absence of such inert solvent as tetrahydrofuran or dioxane. In case the unsaturated compound is a liquid, the solvent need not always be used. But, in case the unsaturated compound is a solid, the solvent must be used. The reaction will well proceed usually at such normal temperature as about 10 to 30° C. Usually, the reaction mixture will once become a transparent liquid from which the reaction product will be deposited. When the reaction mixture is warmed, the reaction velocity will increase. But, if the reaction temperature is too high, such secondary reaction as the decomposition or dimerization of TNO (or INO) will be apt to occur. Therefore, it is not desirable.

The unsaturated compounds to be used in the present invention include those which are either mono- or bi-functional. Among the mono-functional compounds may be included those having the general formula,

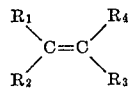

wherein $R_1$, $R_2$, $R_3$, and $R_4$ are selected from the group consisting of -alkyl, -aryl, -cyano, -alkyl halide, -hydrogen, -alkoxy, -hydroxy alkyl, -halide, -carboalkoxy, -acyloxy, and -amide. More specifically, the monofunctional unsaturated compounds of this invention include alkyl and aryl substituted vinyl series unsaturated compounds, as well as all of such compounds forming isoxazol rings with TNO (or INO), as for example, acrylic acid, esters of alkyl alcohols, such as methyl acrylate, ethyl acrylates, etc., methyl methacrylate, glycidyl methacrylate, acryl amide, alkyl acryl amide, such as methylacryl amide, allyl glycidyl ether, allyl alcohol, propargyl alcohol, alkyl vinyl ethers, such as vinyl butyl ethers, maleic anhydrode, fumaric acids and esters thereof, with alkyl alcohols, such as diethyl fumarate, dimethyl fumarate, vinyl acetate, acrylic chloride, cyclohexene, indene, mono- and di-cyclopentadiene, acrylonitrile, benzonitrile, N-phenyl-maleimide, and styrene.

For example, when methyl methacrylate is made to react with TNO, 1,4-bis(5'-methyl-5'-methoxycarbonyl-3'-$\Delta^{2'}$-isoxazolinyl) benzene of a melting point of 172 to 173° C. will be obtained as a product. In the case of monofunctional allyl alcohol, 1,4-bis(5'-hydroxymethyl-3'-$\Delta^{2'}$-isoxazolinyl) benzene of a decomposing point of 214 to 216° C. will be obtained. In the case of mono-functional vinyl butyl ether, 1,4-bis(5'-butoxy-3'$\Delta^{2'}$-isoxazolinyl) benzene of a melting point of 83 to 84° C. will be obtained. In the case of monofunctional dicyclopentadiene, 1,4 - bis(4',5'(2'',3'' - dihydrodicyclopentadieno-2'',3'')$\Delta^{2'}$-isoxazolinyl-3') benzene, which will become black and half melt at 300 to 305° C., will be obtained.

The process of the present invention shall be explained more particularly with reference to examples in the following pages:

EXAMPLE 1

When an equivalent amount of methyl methacrylate was made to react with 50 mg. of terephthaldinitrile N-oxide (TNO) at a room temperature of 150° C. for 2.5 hours, 40 mg. of 1,4-bis(5'-methyl-5'methoxycarbonyl-3'-$\Delta^{2'}$-isoxazolinyl) benzene were separated as crystals from the reaction mixture. The melting point of the crystals as recrystallized from methanol was 172 to 173° C. The results of the analysis of the elements were 60.16% C., 5.48% H, and 8.03% N, and well coincided with the values of 59.99% C, 5.59% H, and 8.77% N, calculated from the molecular formula $C_{18}H_{20}N_2O_6$. In the infrared absorption spectrum, a strong absorption was seen at 1728 cm.$^{-1}$ (C=O).

EXAMPLE 2

40 mg. of TNO were suspended in 4 ml. of tetrahydrofuran. Allyl alcohol in excess of the calculated amount was added to the suspension to react for 3 hours. The reaction product was then recrystallized from ethanol, there were obtained 40 mg. of 1,4-bis(5'-hydroxymethyl-3'-$\Delta^{2'}$-isoxazolinyl) benzene of a decomposing point of 214 to 216° C.

The results of the analysis of the elements were 61.16% C, 5.98% H, and 10.33% N, and well coincided with the values of 60.86% C, 5.84% H, and 10.14% N, calculated from the molecular formula $C_{14}H_{16}N_2O_4$. In the infrared absorption spectrum, there were seen an absorption in the range of 3150 to 3400 cm.$^{-1}$ and an absorption (characteristic of primary alcohol) of a pair of 1046 cm.$^{-1}$ and 1055 cm.$^{-1}$.

EXAMPLE 3

When styrene was made to react with TNO by using dioxane as a solvent in the manner as in Example 2, there were obtained crystals of a melting point of 248° C. They were presumed to be of a bis adduct of the molecular formula $C_{24}H_{20}O_2N_2$ from the element analysis values of 78.29% C and 5.49% H (the calculated values being 78.24% C and 5.47% H).

EXAMPLE 4

In the same manner as Example 3, from TNO and vinyl acetate, there was obtained a bis adduct of the molecular formula $C_{16}H_{16}O_6N_2$ of a melting point of 178 to 180° C. (the element analysis values being 58.05% C, 4.68% H, and 8.68% N, and the calculated values being 57.83% C, 4.85% H and 8.43% N).

EXAMPLE 5

In accordance with the process of Example 3, from TNO and diethyl fumarate there was obtained a bis adduct of the molecular formula $C_{24}H_{28}O_{10}N_2$ of a melting point of 135° C. (the element analysis values being 57.30% C, 5.84% H, and 5.58% N, and the calculated values being 57.14% C, 5.59% H, and 5.55% N.

[Following the foregoing processes, the following table illustrates the adduct reactions between terephthalodinitrileoxide (TNO) and monofunctional unsaturated compound]

| Example No. | Reactant | Structure of adduct | Yield, Percent | Melting Point, ° C. (recrystallizing solvent) | Analysis, percent (Calculated) C | H | N |
|---|---|---|---|---|---|---|---|
| 1 | Methylmethacrylate | (structure with Me, N, O, MeOOC, COOMe) | ca. 100 | 172–173 (MeOH) | 60.16 (59.99) | 5.48 (5.59) | 8.03 (7.77) |
| 2 | Allylalcohol | (structure with HOH₂C, N, O, CH₂OH) | ca. 100 | 214–216 (EtOH) | 61.16 (60.86) | 5.98 (5.84) | 10.33 (10.14) |

[Following the foregoing processes, the following table illustrates the adduct reactions between terephthalodinitrileoxide (TNO) and monofunctional unsaturated compound]

| Example No. | Reactant | Structure of adduct | Yield, Percent | Melting Point, °C. (recrystallizing solvent) | Analysis, percent (Calculated) C | H | N |
|---|---|---|---|---|---|---|---|
| 3 | Styrene | (structure) | 93 | 248–250 (Benzene) | 78.29 (78.24) | 5.49 (5.47) | |
| 4 | Vinylacetate | (structure) | 100 | 178–180 | 58.05 (57.83) | 4.68 (4.85) | 8.68 (8.43) |
| 5 | Diethylfumarate | (structure) | ca. 100 | 110–135 | 57.30 (57.14) | 5.84 (5.59) | 5.58 (5.55) |
| 6 | Methylacrylate | (structure) $C_{16}H_{16}N_2O_6$ | 90 | 176–179 | 57.83 (57.33) | 4.85 (5.80) | 8.43 (8.19) |
| 7 | Acrylonitrile | (structure) | ca. 100 | 260–270 | 63.05 (63.15) | 4.09 (3.79) | |
| 8 | Vinylbutylether | (structure) | | 83.5–84.5 (n-Hexane) | 66.64 (66.75) | 7.83 (7.77) | 7.77 (7.98) |
| 9 | Indene | (structure) | 53 | 380 (o-Trichlorobenzene) | 75.73 (79.57) | 5.28 (5.14) | 5.12 (7.14) |
| 10 | Dicyclopentadiene | (structure) | 30 | 300–305 (o-Trichlorobenzene) | 79.35 (79.21) | 6.42 (6.65) | 6.71 (6.60) |
| 11 | Benzonitrile | (structure) | | 282–284 (Pyridine) | 72.12 (72.17) | 3.85 (3.65) | |
| 11' | Propargyl alcohol | (structure) | | 225–6 ($H_2O$=MeOH) | 61.52 (61.72) | 4.43 (4.44) | 10.30 (10.29) |

[The following examples illustrate the adduct reaction between isobutaldinitrileoxide (INO) and unsaturated compound]

| Example No. | Reactant | Structure of adduct | Yield, Percent | Melting Point, °C. (recrystallizing solvent) | C | H | N |
|---|---|---|---|---|---|---|---|
| 12 | Methacrylamide | (structure) | 70 | 228–32 ($H_2O$) | 58.15 (58.17) | 4.21 (5.49) | 16.83 (16.96) |
| 13 | Acrylamide | (structure) $C_{14}H_{14}N_4O_4$ | 77 | 195–210 ($H_2O$) | 54.51 | 5.18 | 18.54 |
| 14 | N-phenylmaleimide | (structure) $C_{28}H_{18}N_4O_6$ | ca. 100 | –265 | 64.79 (66.40) | 3.85 (3.58) | 11.61 (11.06) |

TABLE—Continued

| Example No. | Reactant | Structure of adduct | Yield percent | Melting point, °C (recrystallizing solvent) | Analysis (Calculated) | | |
|---|---|---|---|---|---|---|---|
| | | | | | C | H | N |
| 15 | Cyclopentadiene | [structure] $C_{28}H_{28}N_2O_2$ (The position of double bond is not certain.) | Small amount | 260–3 | | | 6.80 (6.60) |
| 16 | Indene | [structure] | Small amount | –340 | | | 7.10 (6.69) |
| 17 | Benzonitrile | [structure] | 54 | 192 (Benzene) | | | 15.74 (15.29) |
| 18 | Propargyl alcohol | $HOCH_2$—[structure]—$CH_2OH$ | | 15.8 ($H_2O$-MeOH) | 61.60 | 4.53 | 10.36 |

In accordance with another embodiment of the present invention a 1,3-dipolar cycloaddition polymer having the 1,3- or 1,4-bis(3'-Δ²'-isoxazolinyl)-benzene unit:

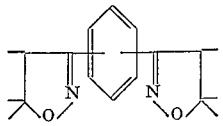

is formed when a bifunctional unsaturated compound is reacted with TNO or INO. Typical bifunctional unsaturated compounds include m - phenylene bismaleimide, ethylene dimethacrylate, and 1,5-hexadiene.

The following examples illustrate this aspect of the present invention:

EXAMPLE 18

0.205 g. of INO was suspended in 80 ml. of O-dichlorobenzene. 0.345 g. (equivalent) of m-phenylenebismaleimide was added to the suspension to retract at room temperature for 50 hours and then at 60° C. for 6 hours. The precipitate was separated by filtration, was dissolved in dimethyl formamide and the solution was dropped into dioxane so as to be precipitated. The polymer product (identified by the infrared absorption spectrum), having a melting point higher than 320° C. was obtained at a rate of yield of 77%. The inherent viscosity ($\eta$ inh.) of the polymer (0.5 g./100 ml. of dimethyl formamide at 30° C.) was 0.15. The polymer produced in accordance with this example is poly 3,3'-(m-phenylene)bis(isoxazoline-4,5-dicarboxy) m-phenylene imide, and the structural formula,

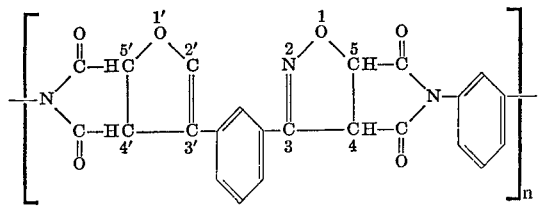

EXAMPLE 19

0.320 g. of INO and 0.396 g. of ethylene dimethacrylate were dissolved in 20 ml. of dioxane. The solution was left standing for 24 hours and was then poured into ether so as to precipitate. Thus, 0.401 g. of a polymer of a melting point of 170° C. was obtained. Its $\eta$ inh. (0.5 g./100 ml. of dimethyl formamide at 30° C.) was 0.21. The polymer produced is polyethylene 3,3'-(m-phenylene)bis(5-methylisoxazoline)5,5'-carboxylate and is represented by the following structural formula:

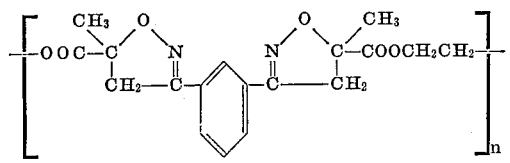

EXAMPLE 20

0.332 g. of INO and 0.170 g. of biallyl (1.5-hexadiene) were dissolved in 22 ml. of dimethyl formamide. The solution was left standing for 24 hours and was then poured into ether so as to precipitate. Thus, 0.431 g. of a polymer of a melting point of 200° C. was obtained. Its $\eta$ inh. (0.5 g./100 ml. of dimethylformamide at 30° C.) was 0.09. The polymer produced is poly 3,3'-(m-phenylene) bis(5-isoxazolinyl)ethane and is represented by the following structural formula:

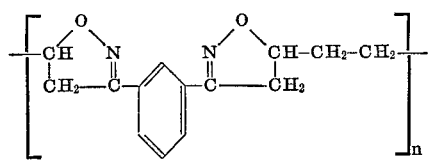

In examples, the used TNO is one which was obtained as follows:

When 0.233 g. of terephthaldihydroxamic chloride of a melting point of 185° C. was dissolved in 20 ml. of methanol and a solution of an equivalent amount of trimethyl amine in 20 ml. of methanol was added to the solution at room temperature of 15° C., colorless needle crystals were soon deposited. The crystals were filtered and were well washed and cleaned with methanol. The rate of yield was 70%. The result of the Cl⁻ ion test with AgNO₃ was negative. When a sample for measuring the melting point was gradually heated, a definite decomposing point was shown at 241 to 243° C. On the other hand, when the sample was put into a bath heated to 150° C., it quickly decomposed. The results of the analysis of the elements were 59.79% C, 2.66% H, and 17.77% N, and well coincided with the calculated values of 60.00% C, 2.52% H, and 17.50% N of the molecular formula $C_8H_4N_2O_2$. In the infrared absorption spectrum, there were characteristic absorptions at 841 (m), 1025 (w), 1100 (s), 1284 (w), 1350 (s), 1405 (w) and 2330 (s) cm.⁻¹. The absorptions of 1350 and 2330 cm.⁻¹ show the characteristics of aryl nitrile N-oxide. There was seen no absorption corresponding to furoxanes.

Also, the used INO is one which was obtained as follows:

When a solution of an equivalent amount of triethyl amine in 10 ml. of methanol was added to a solution of 0.535 g. of isophthal dihydroxamic chloride in 40 ml. of methanol so as to react in the same manner is in the production of above TNO, there was obtained 0.205 g. of INO at a rate of yield of about 56%. The results of the analysis of the elements were 58.34% C, 2.32% H, and 17.69% N, and well coincided with the calculated values of 60.00% C, 2.52% H, and 17.50% N from the molecular formula $C_8H_4O_2N_2$. The product decomposed at 104 to 105° C.

What is claimed is:
1. 1,4 - Bis(5' - methyl - 5'-methoxycarbonyl-3'-Δ²'-isoxazolinyl) benzene.
2. 1,4 - Bis(5' - hydroxmethyl - 3'-Δ²'-isoxazolinyl) benzene.
3. 1,4 - bis(5' - methoxycarbonyl - 3'-Δ²'-isoxazolinyl) benzene.
4. 1,4 - Bis(4',5' - diethoxycarbonyl - 3'-Δ²'-isoxazolinyl)benzene.

References Cited

Iwakura et al., Bull. Chem. Soc., Japan, vol. 38 (1965), pp. 335–6.

Wiley, Heterocyclic Compounds, Interscience, 1962, pp. 99–102.

ALEX MAZEL, Primary Examiner

R. J. GALLAGHER, Assistant Examiner

U.S. Cl. X.R.

260—75, 77.5